United States Patent [19]

Lau et al.

[11] Patent Number: 5,436,042
[45] Date of Patent: Jul. 25, 1995

[54] SHAPED GREEN CERAMIC FABRIC PREFORM SEGMENTS FOR FIBER-REINFORCED COMPOSITE ARTICLES

[75] Inventors: Sai-Kwing Lau, East Amherst; Roger W. Ohnsorg, Grand Island; Salvatore J. Calandra, North Tonawanda, all of N.Y.

[73] Assignee: The Carborundum Company, Niagara Falls, N.Y.

[21] Appl. No.: 212,536

[22] Filed: Mar. 11, 1994

[51] Int. Cl.⁶ ............................................. F16B 5/00
[52] U.S. Cl. ........................................ 428/34.6; 428/33; 428/53; 428/221; 264/28
[58] Field of Search ........... 428/33, 34.6, 53, 221; 264/28; 156/634

[56] References Cited

U.S. PATENT DOCUMENTS

| | | |
|---|---|---|
| 4,294,788 | 10/81 | Laskow, et al. |
| 4,341,725 | 7/1982 | Weaver et al. ............... 264/28 |
| 4,469,038 | 9/84 | Haluska. |
| 4,781,993 | 11/88 | Bhatt. |
| 4,812,271 | 3/89 | Koba, et al. |
| 4,846,866 | 7/89 | Chyung, et al. |
| 4,885,265 | 12/89 | Hillig, et al. |
| 4,908,340 | 3/90 | Frechette, et al. |
| 4,944,904 | 7/90 | Singh, et al. |
| 5,047,181 | 10/1991 | Occhionero et al. ........ 264/28 |
| 5,108,964 | 4/92 | Corbett, et al. |
| 5,196,120 | 3/93 | White. |
| 5,281,559 | 1/94 | Bansal. |
| 5,296,311 | 3/94 | McMurtry, et al. |

OTHER PUBLICATIONS

F.K. Ko. Ceramic Bulletin, Vol. 68, No. 2, pp. 401–414, (1989).
R. Warren, Ed., Ceramic-Matrix Composites, Chapman & Hall, Inc., New York, NY, 1992, pp. 188–189.
J.A. Cornie, Ceramic Bulletin, Vol. 65, No. 2, pp. 293–304, (1986).
K.K. Chawla, Ceramic-matrix Composites, Chapman & Hall, Inc., New York, NY, 1993, pp. 135–157.
Engineered Materials Handbook, Vol. 4, Ceramics and Glasses, ASM International, 1991.
H.P. Klug & L.E. Alexander, X-Ray Diffraction Procedures for Poly Crystalline & Amorphous Materials, 2nd Editionn, John Wiley & Sons, New York, NY, 1974.

*Primary Examiner*—Patrick J. Ryan
*Assistant Examiner*—Richard P. Weisberger
*Attorney, Agent, or Firm*—Richard L. Hansen

[57] ABSTRACT

This invention is directed to substantially strain-free, shaped, sintered ceramic fabric preform segments, to the production of the sintered preform segments from novel fixtured, shaped, green ceramic fabric preforms, and to sintered ceramic fiber-reinforced composite articles prepared from the sintered preforms and characterized in that the reinforcement phase is substantially free of mechanical strain, and the fiber in the fabric can exhibit a very small bending radius.

9 Claims, 10 Drawing Sheets

SHAPED GREEN CERAMIC FABRIC PREFORM SEGMENTS FOR FIBER-REINFORCED COMPOSITE ARTICLES

This invention is in the field of ceramic fiber-reinforced composite articles, to methods for making the composite articles, and to shaped, sintered ceramic fabric preform segments for use in making complex composite parts.

BACKGROUND

As the demand for structural materials capable of meeting ever higher targets for strength and thermal stability increases, the attention of materials scientists and engineers is shifting to reinforced composite materials for use in demanding applications, such as high performance aircraft, rockets, missiles, turbines, etc. Such reinforced composites typically consist of a matrix phase with a continuous or discontinuous reinforcement dispersed therein. The matrix phase can be metallic, cermet, intermetallic, polymeric, glass-ceramic, or it can be ceramic, for example.

Ceramics are assuming a prominent role in advanced composite materials. It is common knowledge that ceramics are strong, lighter than metals, and can withstand higher use temperatures than other structural materials. But ceramics have a reputation for brittleness and flaw-dependent properties. Brittleness can lead to the catastrophic failure of a ceramic part. In efforts to overcome this undesirable property, various schemes have been devised for toughening ceramic materials and making them less flaw-dependent. One technique involves adding a reinforcement phase, thereby creating reinforced ceramic matrix composites. The same principles applied to improving the performance of ceramics have been employed with other matrix materials as well.

The reinforcement phase for a composite article can be present in the form of particles, platelets, whiskers, chopped fibers, continuous fibers, fabric, etc. The addition of a reinforcement can substantially toughen the material, as measured, for example, by the work of fracture (WoF), which is directly related to the fracture resistance of the material. WoF is discussed, e.g., in "Ceramic Matrix Composites," R. Warren Ed., Chapman and Hall, Inc., New York, N.Y. 1992, pp. 188–189.

Fibrous reinforcements, such as continuous fibers and woven or non-woven fabrics, are especially effective in composite materials. The term "woven" in this application, unless clearly limited to fabrics made by weaving, should be taken to include fabrics made by knitting, braiding, etc. as well as by weaving. The current invention utilizes either woven or non-woven ceramic fabrics, or combinations thereof, as the reinforcement phase. In general, woven two- and three-dimensional ceramic fabrics can be produced from ceramic fibers by methods well known in the cloth-making art. The ceramic fibers can be continuous monofilament, a tow, yarn or roving consisting of a multitude of monofilaments, or continuous fiber tows or yarns can be made from shorter fibers and woven into fabric. Non-woven ceramic fabrics can be produced from ceramic fibers by what, in essence, is paper-making technology, also well known to those skilled in the art, and three-dimensional orthogonal non-woven fabrics technology is quite well developed.

It is necessary, for purposes of this application, to distinguish between green ceramic fabrics which contain green ceramic fiber and sintered ceramic fabrics which contain fired or sintered ceramic fiber. For purposes of this application, a "green" ceramic fabric or "green" ceramic fiber means a sinterable fabric or fiber which is in a pre-densified, or partially fired or cured state and generally also contains a binder, e.g., a flexible polymer matrix, which facilitates production of the fiber and fabric but is later removed. A "sintered" ceramic fabric or "sintered" ceramic fiber, on the other hand, means a green fabric or fiber which has been densified, generally by heating. Both types of ceramic fabric are important components of the instant invention.

In the manufacture of a ceramic fiber-reinforced composite article, a ceramic fabric can be shaped into a preform which can be fitted into a mold corresponding to the desired article. The preform in the mold, or in some cases freestanding, is infiltrated with the desired matrix phase, e.g., metal, cermet, intermetallic, polymer, glass-ceramic, or ceramic, and may be heated and/or pressed to produce the desired composite article. In some cases one or more intermediate resin or slurry infiltration steps are included before the final consolidation.

The prior art dealing with the production of composite articles reinforced with ceramic fiber generally begins with a sintered fiber.

Singh, et al., U.S. Pat. No. 4,944,904, discloses coating fibers, including woven fibers, with BN, the only specifically exemplified fiber being carbon, although others, e.g., SiC, are disclosed. The coated fiber is then further coated with a material wettable by Si, e.g., carbon, viz., pyrolytic carbon. The resulting twice-coated fiber is admixed with an "infiltration-promoting material," e.g., more carbon, which is wetted by molten silicon. The infiltration-promoting substance may also include a ceramic material, e.g., silicon carbide. The admixture, slurried in a liquid or with a resin added, is shaped into a preform or compact, e.g., by extrusion, injection molding, die pressing, isostatic pressing, or slip casting. The preform is then infiltrated with Si plus B (0.1–10 wt %). Infiltration is conducted under an inert gas, e.g., Ar, or preferably vacuum, in a carbon furnace. It is said the technique can be used for producing composite parts of simple, complex and/or hollow geometry.

Corbett, et al., U.S. Pat. No. 5,108,964, describes the production of a preform for a metal matrix composite in which a mixture of randomly oriented inorganic fibers or whiskers, a thermoplastic material, such as paraffin, and surfactants is prepared, molded to a desired shape, and heated to remove the binder, providing a shaped preform, which can then be infiltrated with the metal. The molded preform is supported during binder removal to prevent distortion, slumping, etc. This is preferably done by packing the shaped preform into a bed of finely divided inorganic powder which absorbs the organics as their melting points are reached. The invention is specifically embodied in a printed circuit board. The '964 patent is representative of prior art which describes molding a composite part from a mix which contains both a dispersed whisker or chopped fiber reinforcement phase and the matrix phase.

White, U.S. Pat. No. 5,196,120, discloses production of a candle filter, i.e., a cylindrical tube with one open end, comprising two parts, a filtering surface, and a support made from continuous ceramic fiber, e.g., aluminoborosilicate fiber. Tows of ceramic fiber are texturized and then braided or woven into cloth and formed into the desired shape. The shape is rigidized by applying a phenolic resin to the formed cloth. The rigid member is then coated with a filtering surface, i.e., chopped ceramic fiber or felt. The construction is overcoated and infiltrated with a layer of SiC by chemical vapor deposition using hydrogen and methyltrichlorosilane, during which the phenolic is carbonized, which promotes adhesion of the SiC coated filtering surface to the ceramic preform.

The techniques described in the above-cited patents, which all employ sintered fiber/fabric, are limited in application, because the bending and stretching of the sintered fiber or fabric are restricted by the stiffness, high elastic modulus, and "memory" inherent in a sintered fiber, limiting the range of complexity which can be achieved in any composite part made using the technique. In addition, the residual strain present in fabrics woven from sintered fibers decreases their strength.

Laskow, et al., U.S. Pat. No. 4,294,788, addresses this last-cited problem. A silicon carbide fiber/silicon matrix composite article is produced by first making a preform of carbon fiber or cloth and a binder such as cellulose acetate, polyester, resins, or colloidal graphite, placing the preform in a mold, which can be made of graphite, optionally adding some silicon carbide powder, and then infiltrating the preform with molten silicon. It is said the silicon reacts with the carbon fiber to produce aligned silicon carbide crystals in a silicon matrix with silicon carbide dispersed throughout the matrix. The technique is said to be useful for the production of gas turbine, aircraft engine, diesel engine, etc. parts.

The '788 patent discloses a way to produce an article in which the ceramic reinforcement is free of mechanical strain. However, the in situ formed SiC phase is really a collection of aligned silicon carbide crystals which do not have the strength and other properties desired in a reinforcing ceramic fiber or fabric. Articles produced by this technique do not exhibit the mechanical behavior of fiber-reinforced composites.

Technical challenges confronting those seeking to reach the next performance plateau in ceramic fiber-reinforced composites have been set forth by F. K. Ko in *Ceram. Bull.*, 68, 401–414 (1989); i.e., at p. 412, "The first challenge is the question of conversion of brittle fibrous materials to textile structures. As a rule, the higher the temperature capability of the fiber the stiffer and more brittle it is. This processing difficulty with brittle fibrous structures calls for an innovative combination of materials systems such as material and geometric hybridization." The instant invention represents such an innovation.

SUMMARY OF THE INVENTION

In contrast to the techniques disclosed in the prior art, ceramic fiber-reinforced composite articles of elementary to complex shape can be produced readily by the current invention in which fabric produced from green ceramic fiber is utilized. Advantages of the invention include the production of articles which display composite behavior at lower cost than if fabric produced from sintered fibers were employed. Furthermore, the shaping of a green, rather than a sintered ceramic fabric, permits, not only bending the fabric about a single axis, but also stretching the fabric, permitting the production of preforms which contain complex curvature about multiple axes. In addition, bends in the preform can be sharper, because of the compliant nature of a green fabric compared with the stiffness of a sintered fabric. Another advantage is that in many cases sintered ceramic fabric preforms of this invention are free-standing, which makes them easy to handle and work with.

The invention has several aspects. A sintered ceramic fabric preform segment, which is preferably substantially free-standing, substantially free of mechanical strain, and shaped to at least a part of the contour of a desired composite article, as well as a method by which the shaped, sintered preform segment can be produced, are central aspects of the invention.

One aspect of the invention is a combination from which a substantially strain-free, shaped, sintered ceramic fabric preform segment, key to the production of composite articles, readily results. This aspect of the invention is a fixtured, shaped, green ceramic fabric preform segment which comprises at least one piece of green ceramic fabric in combination with a plurality of fixture elements shaped to the contour of at least a portion of the desired composite article, nested but spaced apart to sandwich the green ceramic fabric. An advantage of a green fabric over a sintered ceramic fabric is the ease of shaping a green fabric to the desired geometry.

A second aspect of the invention, closely related to the first, is a method for making a substantially strain-free, shaped, sintered ceramic fabric preform segment which comprises sandwiching green ceramic fabric, with or without having first removed binder from the fabric, between a plurality of fixture elements shaped to the contour of at least a portion of the desired composite article, the fixture elements being nested but spaced apart to enclose the green ceramic fabric, yielding a fixtured, green ceramic fabric preform segment shaped to the contour; step-wise or simultaneously removing any remaining binder from the green ceramic fabric and sintering the fixtured, shaped, green ceramic fabric preform segment; and then recovering the substantially strain-free, shaped, sintered ceramic fabric preform segment.

The third aspect of this invention is the substantially strain-free, shaped, sintered ceramic fabric preform segment whose production was described immediately above. The sintered preform segment is a key to making complex composite parts. By shaping a green ceramic fabric, bends and stretches can be introduced to accommodate contours desired in the final composite part, without introducing mechanical strain into the sintered preform segment. By judiciously choosing the shapes of the preform segments, coupled with the ability to easily bend, stretch, and join individual stacked pieces of the green ceramic fabric, just about any sintered ceramic fiber-reinforced composite article, elementary to complex in shape, can be made by the techniques of this invention.

In some cases it is possible to arrange the sintered preform segment or segments according to their respective shape(s), reproducing the volume and contour of the desired composite article, and then infiltrate the arranged sintered preform segment(s) directly with a matrix material, e.g., by chemical vapor infiltration (CVI). In other cases, e.g., if a ceramic matrix material is to be introduced by slip casting, it is advantageous to arrange the sintered preform segment(s) in a mold for the desired composite article according to their shape(s), yielding a form for the desired sintered ceramic fiber-reinforced composite article.

Accordingly, another aspect of the invention is a form for a sintered ceramic fiber-reinforced composite article which comprises the combination of a mold having an internal cavity shaped to the contour of the desired composite article; together with at least one substantially strain-free, sintered ceramic fabric preform segment shaped to the contour of at least one portion of the composite article and contained within the mold cavity adjacent that portion.

Yet another aspect of the invention is a method for producing a sintered ceramic fiber-reinforced composite article which comprises making as many substantially strain-free, shaped, sintered ceramic fabric preform segments as necessary to reproduce the volume and contour of the desired composite article; then arranging the sintered preform segments according to their respective shapes, optionally in a mold of the desired composite article, thereby reproducing the volume and contour of the composite article; infiltrating the sintered preform segment(s), or the form, with at least one matrix material; and finally recovering the composite article. In certain embodiments of the invention, more than one matrix material may be infiltrated in separate steps.

The sintered ceramic fiber-reinforced composite article is still another aspect of this invention, comprising at least one matrix material surrounding a sintered ceramic fabric reinforcement, the reinforcement being substantially free of mechanical strain.

DETAILED DESCRIPTION

A fixtured, shaped, green ceramic fabric preform segment constitutes one aspect of this invention. There are two elements in this combination, a fixture and green ceramic fabric.

F. K. Ko, in *Ceram. Bull.*, 68, 401–414 (1989), cited above, describes a variety of fabrics and their utility in composites. This Ko paper is incorporated by reference; e.g., for its detailed description of various fabric architectures. The selection of the fabric architecture for use in reinforcing a specific composite part will depend upon several factors. These include the directionality of the stress to which the fabric will be subjected, the degree of fiber packing in the fabric, and the ease with which the fabric can be infiltrated with a matrix material. Other factors include the capability for in-plane multiaxial reinforcement and reinforcement through the fabric thickness. The most familiar fabrics are substantially 2-dimensional; i.e., they consist of 2 or 3 yarn diameters in the thickness direction z, with fibers oriented in the x—y plane. In the following description of fabric types the term "woven" is restricted to its strict technical meaning.

Figure 1:
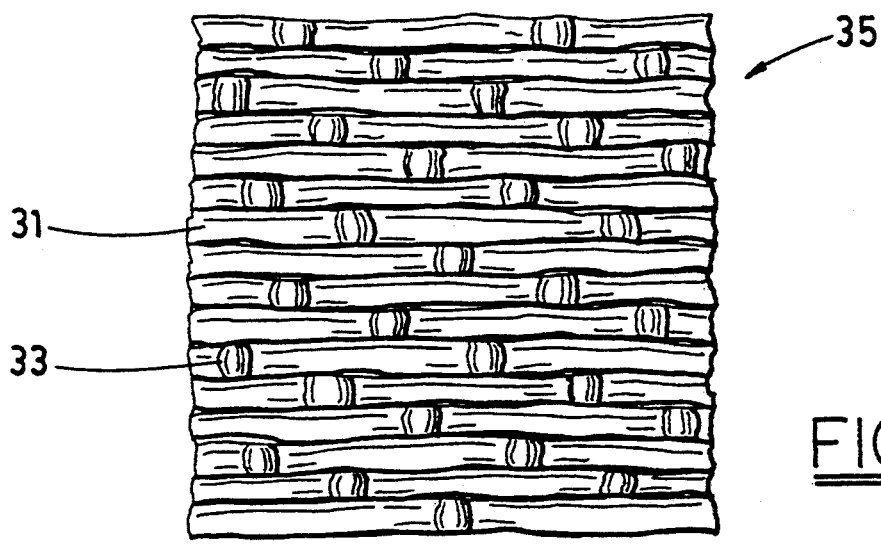
FIG. 1 is a plan view showing a typical green ceramic fabric employed in the invention.

Hundreds of possible woven fabric combinations can be made by interlacing ceramic fiber yarns. An exemplary ceramic fabric which can be employed in the invention is shown in FIG. 1. The particular weave illustrated in FIG. 1 is called 8 harness satin or "8HS." This weave is characterized by the fact that every yarn 33 is laced over every eighth yarn 31. An 8HS weave green ceramic fabric is employed in the Examples, below.

8HS is a biaxial weave. There are three basic types of biaxial weaves: plane, twill and satin, and any of these weaves can be employed in the invention. In selecting between them, the following characteristics should be borne in mind: the greatest amount of yarn interlacing is found in the plane weave, the least amount of yarn interlacing in the satin weave. Consequently, a fabric with the plane weave is more tightly woven and has greater structural integrity than the satin weave. However, the satin weave preserves more of the strength and modulus of the ceramic fiber from which the fabric is made and is looser than the plane weave, which can make it easier to infiltrate the satin weave with a matrix material. In addition, a higher fiber packing density in the composite part can be achieved with the satin weave than with the plane weave. The twill weave has characteristics which lie between those of the plane and satin weaves.

Triaxial woven green ceramic fabrics can also be employed in the invention; a familiar example of a triaxial weave is the seat on a cane chair. The triaxial weave is characterized by including three yarns in the fabric plane, providing 60° between yarns, compared with 90° between yarns in biaxial weaves. Consequently, all else being the same, a triaxial weave has higher in-plane shear resistance than a biaxial weave. Dimensional stability at a relatively low volume fraction of fiber can be achieved with a triaxial weave. These are important considerations in making certain composite articles.

Knitted fabrics are characterized by interlooping the yarns, which makes a knitted fabric bulkier than a woven fabric, all else being equal. Consequently, the maximum fiber loading in a composite article is less if the knitted fabric is employed. The severe bending of the yarn required to make the loops is a limitation which makes it very difficult to knit a yarn made from a sintered ceramic fiber. However, the green ceramic yarns, tows or rovings employed in the instant invention generally can be made into knitted fabrics because of the high flexibility and much smaller bending radius, or much larger critical diameter of the green ceramic fibers employed in this invention. The term "critical fiber diameter" is defined in F. K. Ko, loc. cit., p. 402 as "the diameter at which the fiber would rupture when bent to a radius of curvature R." The relation between these parameters is set forth in a Ko equation:

$$\delta_c = \frac{2R}{\left(\frac{E}{\sigma_c} - 1\right)} \quad (1)$$

where $\sigma_c$ is the critical strength, E is the modulus, R is the bending radius, and $\delta_c$ is the critical fiber diameter.

In evaluating the ability to weave a given fiber into a fabric and to manipulate the resultant fabric, the minimum attainable radius of curvature (R) for the fiber is an important parameter. However, it is clear from Eq. 1 that this radius, besides being a function of the fiber strength and modulus, also varies with the fiber diameter. For a given fibrous material, as the fiber diameter decreases, the degree to which the fiber can be bent increases. Thus, since it is fiber diameter dependent, R is not a completely accurate parameter to use for comparing the degrees of flexibility of different fibrous materials.

Following Eq. 1, a parameter, termed the "flex index" or "$\zeta$", is utilized in this application and is defined by the equation:

$$\zeta = \delta/R = 2\{(E/\sigma)-1\}^{-1} \times 10^3 \quad (2)$$

where $\delta$ is the fiber diameter measured in micrometers, R is the minimum radius of curvature in millimeters which can be assumed by that fiber without rupturing, E is the modulus of the fiber, and $\sigma$ is the tensile strength of the fiber.

This parameter $\zeta$, which is essentially the ratio of the fiber diameter to its minimum bending radius, is a function of the fiber strength and modulus only. It can be used as a quantitative measure of the flexibility of a fibrous material, independent of the fiber diameter. It is clear from Eq. 2 that, for a fiber with any given fiber diameter, the larger the flex index, the smaller the bending radius the fiber can assume without rupture and, thus, the more weavable it is.

Table I presents flex indexes for various sintered ceramic and other fibers, as well as the flex index for a representative green ceramic fiber utilized in this invention. It is clear that the degree of flexibility of the green ceramic fiber employed in this invention is orders of magnitude higher than the sintered ceramic and other fibers.

TABLE I

| THE FLEX INDEX FOR VARIOUS FIBERS FOR COMPOSITE APPLICATIONS | |
|---|---|
| Fiber[a] | Flex Index, $\zeta$ |
| Alumina | |
| "Fiber FP", DuPont | 7.3 |
| "PRD 166", DuPont | 11.0 |
| Sumitomo | 15.4 |
| Mullite | |
| "Nextel 440", 3M | 29.5 |
| "Nextel 312", 3M | 20.9 |
| SiC Monofilament | |
| "SCS-6", Avco | 17.0 |
| "Sigma", Berghof, Tubinger | 17.0 |
| Si—O—C Multifilament | 27.5 |
| "Nicalon", Nippon Carbon | |
| Si—Ti—O—C | 29.0 |
| "Tyranno", UBE | |
| Si$_3$N$_4$ | 22.6 |
| "TNSN", Toa Nenvyo Kogyo K.K. | |
| Pure Fused Silica | 105.3 |
| "Astroquartz", J. B. Stevens | |
| Graphite | |
| "T300R", Amoco Perform. Pdts. | 20.2 |

TABLE I-continued

THE FLEX INDEX FOR VARIOUS FIBERS FOR COMPOSITE APPLICATIONS

| Fiber[a] | Flex Index, ζ |
| --- | --- |
| "T40R", Amoco Perform Pdts. | 25.3 |
| Green SiC Monofilament of This Invention | >2285.0[b] |

[a]Data for all but the last fiber were obtained from Ko, Ceram. Bull., 68, 401 (1989).
[b]The minimum bending diameter of a green SiC fiber disclosed in Frechette, et al., U.S. Pat. application 07/838,960, filed February 21, 1992 and used in this invention is measured by bending the 160 micrometer diameter fiber around a 0.14 mm diameter mandrel. The flex index reported here is limited by the size of the available mandrel, not the fiber.

In making a braided fabric, three or more yarns are intertwined, and either flat or tubular fabric structures can be produced. In general, braided fabrics are characterized by conformability and excellent shear resistance. These can be important properties in some fiber-reinforced composite articles.

Substantially planar, green ceramic fabrics, as described above, can be employed in this invention, the selection of the specific fabric type being governed by the properties required in the final composite article, fabric characteristics as described above, and the textilability of the green ceramic fiber, tow, yarn or roving. "Textilability" refers to the ability to make fabric from a particular fiber, tow, yarn or roving. In those cases in which the desired sintered ceramic fiber-reinforced composite article comprises planar sections, one or more plies of a substantially planar fabric can be laid up to produce the thickness desired. The plies can be laced together to improve the shear strength between plies if necessary. Alternatively, 3-dimensional fabrics can be produced to occupy part or the entire internal volume of the composite article.

Fabrics which are 3-dimensional can be produced by weaving, knitting or braiding, and orthogonal non-woven 3-dimensional fabrics can be produced as well. The 1989 Ko article cited above describes 3-dimensional fabrics and their production. Knitting and braiding techniques can also be employed to produce complex 3-dimensional green ceramic fabrics. In general, a 3-dimensional green ceramic fabric is preferred over a combination of 2-dimensional fabric plies because of the highly damage resistant structure of the composite article reinforced therewith. Production of a desired 3-dimensional sintered ceramic fabric preform segment is achieved much more readily by utilizing a 3-dimensional green ceramic fabric within the scope of this invention, than by attempting production of the sintered ceramic preform segment directly from sintered fiber or fabric.

Thus, both woven and non-woven green ceramic fabrics (the term "woven" being used broadly), as well as combinations thereof, can be employed in the invention. Suitable fibrous materials from which the fabrics can be made include both oxide and non-oxide fibers. Suitable oxide materials include $Al_2O_3$, $SiO_2$, $ZrO_2$, zircon, mullite, spinel, yttria, and mixtures thereof, such as YAG. Suitable non-oxide materials include $Si_3N_4$, SiC, $B_4C$, BN, $TiB_2$, AlN, and mixtures thereof. Mixtures of oxide and non-oxide components in a fiber and fabrics containing fibers of various compositions are also contemplated for use in the invention. Production of fibers from the aforesaid materials is well known to those skilled in the ceramics art.

The diameter of a fiber to be employed in a fabric used in this invention is advantageously selected large enough that the shaped, sintered ceramic fabric preform segment produced from the fabric is substantially free-standing. The preform segment will then readily maintain its position for infiltration, either free-standing or in a mold in which the preform segment is ultimately positioned. However, the diameter cannot be so great that the textilability of the fiber, yarn, tow or roving is adversely affected. The textilability can be controlled in many cases by adjusting the binder material which is commonly a part of the green fiber composition. In general, the diameter of the green fiber will usually be selected to yield sintered fiber with a diameter in the range of about 10 micrometers to about 300 micrometers.

The individual green ceramic fibers, the yarn, tow or roving made therefrom, or green fabric woven therefrom, optionally can be coated with a material to interface with the matrix prior to producing the fabric and then co-fired with the green fiber or fabric. Alternatively, a substantially strain-free, shaped, sintered ceramic preform segment of this invention can be coated with an interface coating, such as BN or AlN, for example. Methods for applying such coatings are well known to those skilled in the art; e.g., see C. H. McMurtry, et al., U.S. Pat. No. 5,296,311, filed Mar. 17, 1992.

Figure 2:
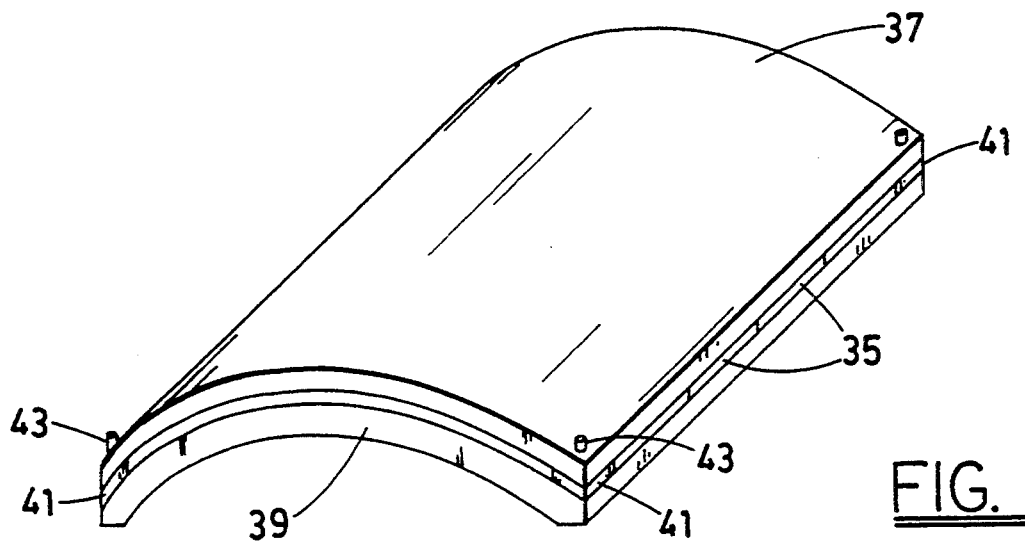
FIG. 2 is an isometric view showing one embodiment of the fixtured, shaped, green ceramic fabric preform segment of this invention.
Figure 3:
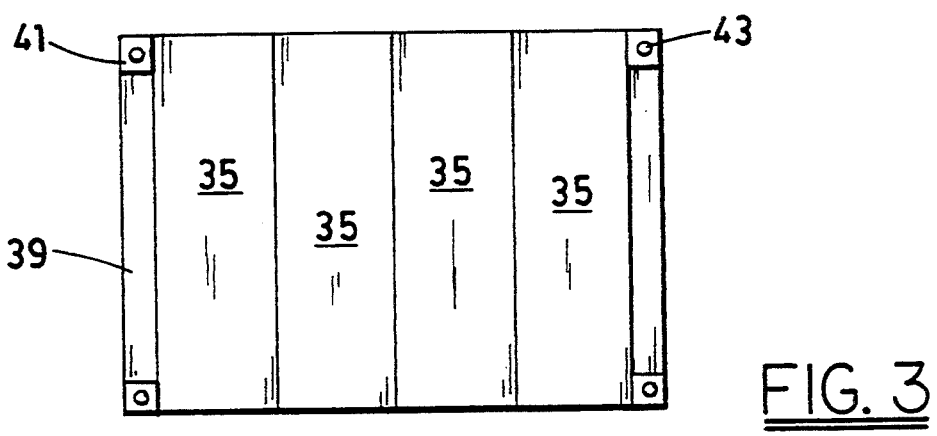
FIG. 3 is a plan view of the fixtured, shaped, green ceramic fabric preform segment of FIG. 2 with the top fixture element removed.

One embodiment of the fixtured, shaped, green ceramic fabric preform segment of this invention is shown in FIGS. 2 and 3. One element of the combination is the green ceramic fabric 35 of FIG. 1, The second element of the fixtured green ceramic fabric preform segment is a fixture. The fixture's primary function is to shape and contain at least one piece of green ceramic fabric during sintering. With reference to FIG. 3, it will be evident that four separate pieces of the green ceramic fabric are accommodated by the fixture which is illustrated. The size and shape of the green fabric piece(s) and the fixture must reflect the dimensions desired in the sintered fabric preform segment; both the green fabric and the sintered fabric preform segment can be trimmed, sanded, etc. as necessary to fit the green fabric into the fixture, the sintered fabric preform segment into a mold, etc.

The fixture includes a plurality, but generally two, fixture elements, top fixture element 37 and bottom fixture element 39. In the space between them, the elements are shaped to the contour of at least a portion of the desired composite article and nested, but spaced apart by about the thickness of the green ceramic fabric. A fixtured, shaped, green ceramic fabric preform segment results by placing the fixture elements on either side of the green fabric and bringing the fixture elements together to sandwich the green fabric between them. The separation between the fixture elements can be maintained in numerous ways; one way is to provide spacers 41, held in place with dowels 43 to allow for unrestrained shrinkage movement during sintering.

Figure 8:
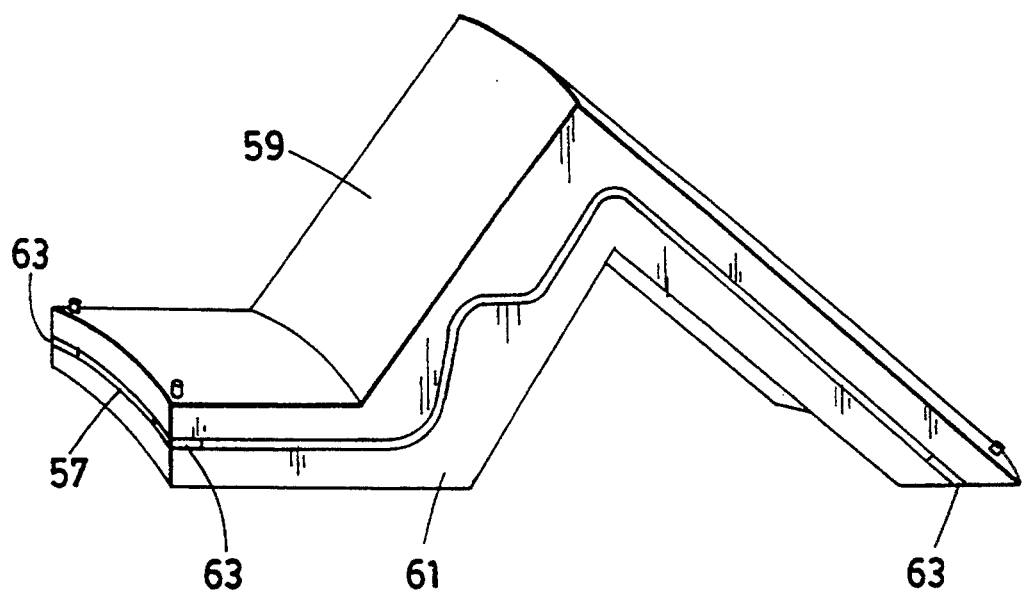
FIG. 8 is an isometric view showing another embodiment of the fixtured, shaped, green ceramic fabric preform segment of this invention.

Whereas, a wide range of materials is available from which fixture elements can be constructed, the sintering temperature and surrounding atmosphere for the particular green fabric must be prime considerations in selecting the fixture material, since the fixture elements should be stable at temperatures exceeding the sintering temperature of the fabric and survive the sintering operation intact. It is also an important consideration in selecting a material for the fixture that it be machineable or otherwise capable of being shaped to include the desired contour to be imparted to the ceramic fabric. Candidate materials include refractory metals, such as W, Ta, Nb and Mo, carbon or graphite, and ceramic materials, e.g., the same ceramic material from which the ceramic fabric is made. In the fixtures illustrated in the Figures, including the fixture of FIGS. 2 and 3, fixture elements 37 and 39, as well as dowels 43 can be machined from graphite, and spacers 41 made from a carbonaceous material, such as "GRAFOIL" available from Union Carbide Corp A somewhat more complicated embodiment of the fixtured, shaped green ceramic fabric preform segment of this invention is illustrated in FIG. 8. Green ceramic fabric 57 is sandwiched between top fixture element 59 and bottom fixture element 61, spacers 63 holding the fixture elements apart so that the fabric is sintered under substantially no applied pressure, in order to provide freedom for shrinkage movement.

Figure 13:
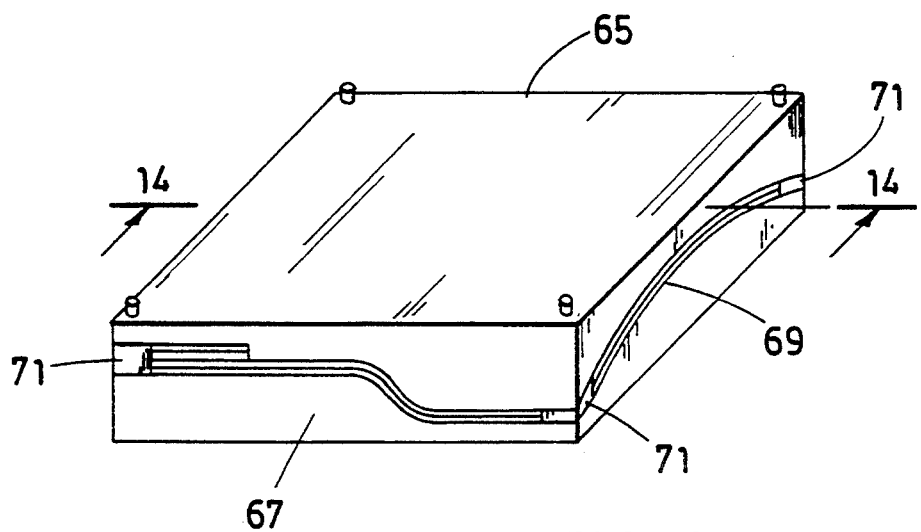
FIG. 13 is an isometric view of another embodiment of the fixtured, shaped, green ceramic fabric preform segment of this invention.
Figure 14:
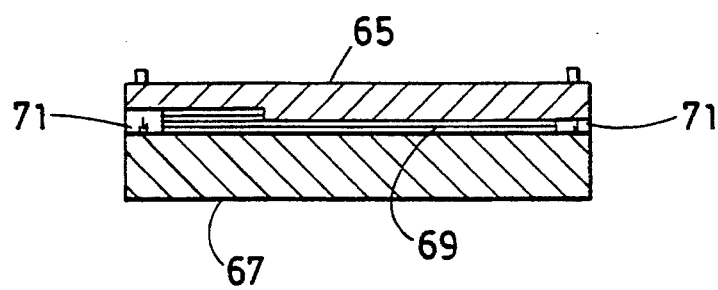
FIG. 14 is a sectional view taken along line 14—14 in FIG. 13.

FIGS. 13 and 14 show an even more complex embodiment of the fixtured, shaped, green ceramic fabric preform segment of this invention. In this case, top fixture element 65 and bottom fixture element 67 sandwich green ceramic fabric 69 which changes in thickness across the segment, the thicker sections being built up by using additional plies of the green fabric, which can be stitched together if desired. Again, spacers 71 are employed to ensure that the green preform segment is not compressed during sintering, but is free to move in the fixture.

Figure 15:
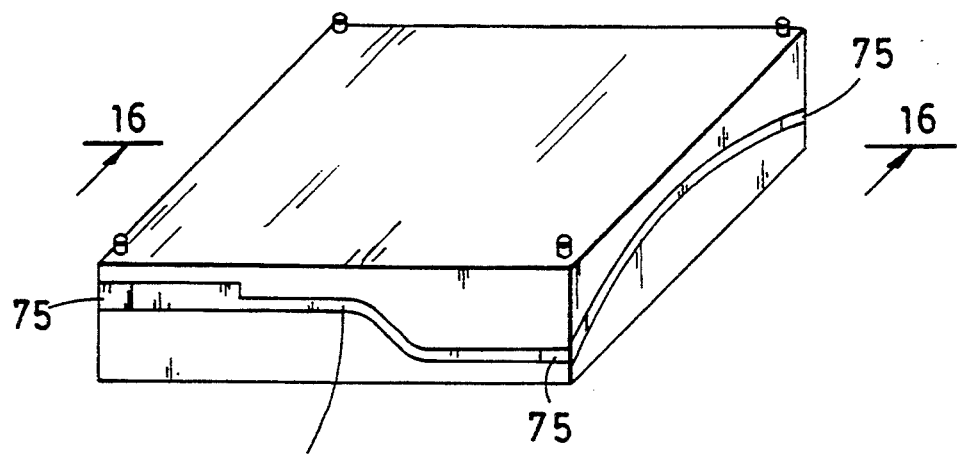
FIG. 15 is an isometric view of yet another embodiment of the fixtured, shaped, green ceramic fabric preform segment of this invention.
Figure 16:
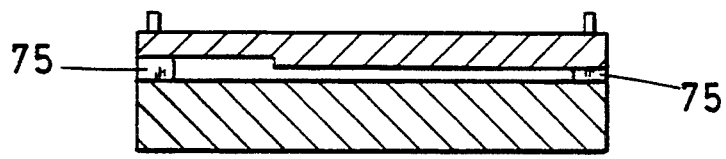
FIG. 16 is a sectional view taken along line 16—16 of FIG. 15.

FIGS. 15 and 16 show an embodiment of the fixtured, shaped, green ceramic fabric preform segment of this invention which is similar to that shown in FIGS. 13 and 14, except that the entire green fabric 73 of varying thickness is a one piece, 3-dimensional fabric produced as described above. Spacers 75 are employed to ensure that the green fabric is free to shrink during sintering and that the sintered preform segment is substantially free of mechanical strain.

The embodiments of the fixtured, shaped, green ceramic fabric preform segment of this invention shown in FIGS. 13-16 also illustrate another feature of this invention. That is, the green fabric employed in this invention, as opposed to sintered fabric, has the ability to, not only bend, but also stretch. Thus the green fabric can be conformed to complex curvature in the fixture elements, i.e., curvature about more than one axis, which is present in the fixtures shown in FIGS. 13-16. In the event the complex curvature is extreme, it may be necessary to mount the fixture elements on or as the platens of a press as shown in FIG. 17 in order to stretch the green fabric sufficiently to acquire the shape of the fixture elements.

Figure 17:
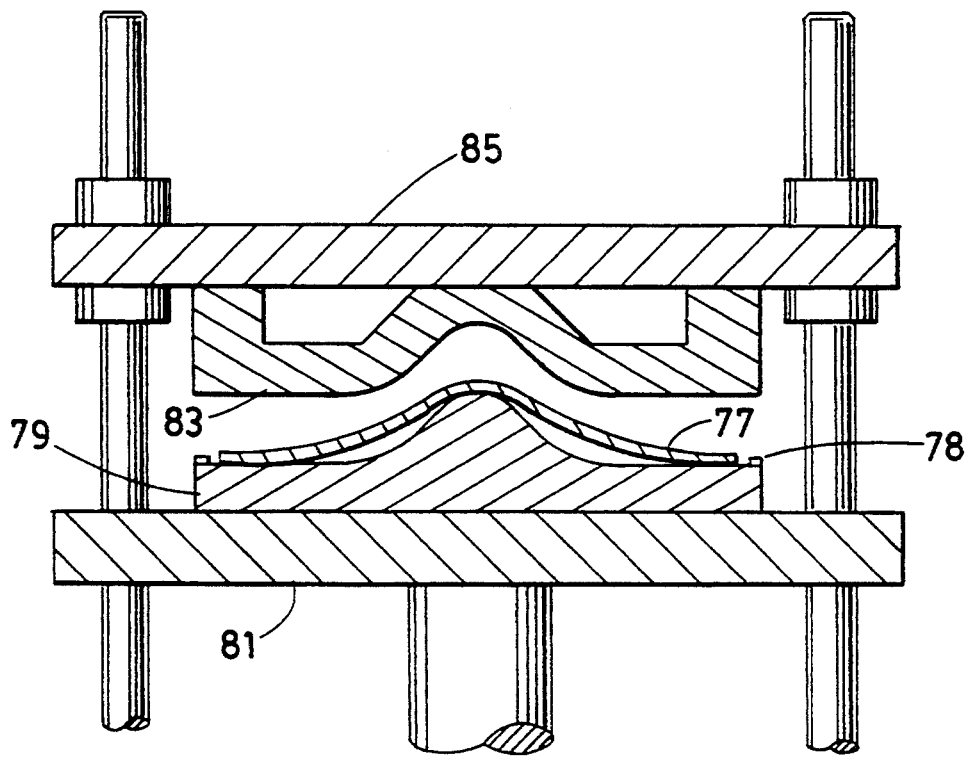
FIG. 17 is a sectional view of a press with fixture elements affixed to the platens thereof preparatory to sandwiching a green ceramic fabric between the fixture elements.
Figure 18:
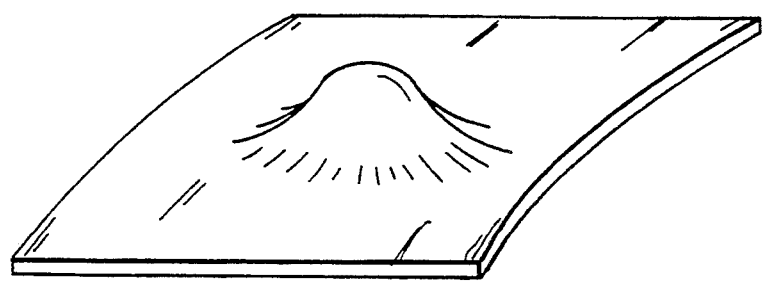
FIG. 18 is an isometric view of another embodiment of the substantially strain-free, shaped, sintered ceramic fabric preform segment of this invention produced by sintering the fixtured, shaped, green ceramic fabric preform segment derived from the fixture/fabric combination shown in FIG. 17.

With reference to FIG. 17, fabric 77 is laid across bottom fixture element 79, which is affixed to one platen 81 of a press. Upper fixture element 83 is affixed to platen 85 of the press. Fabric 77 can be stretched to assume the contour of the fixture elements by bringing the platens together. Note the spacers 78 to limit the degree to which the fabric can be squeezed. Once stretched, the platen pressure can be decreased and the stretched fabric sintered, providing a sintered preform segment which is substantially free of mechanical strain. Such a substantially strain-free, shaped, sintered ceramic fabric preform segment is shown in FIG. 18.

Figure 19:
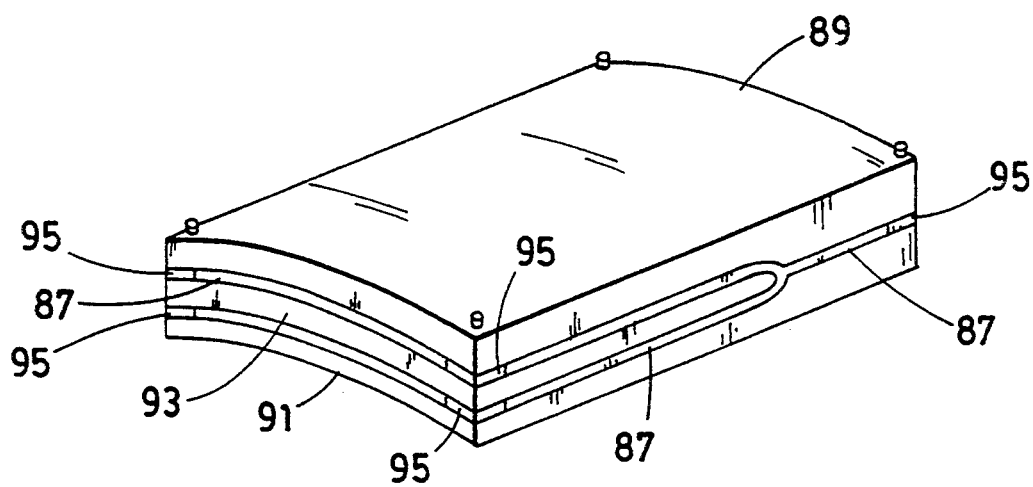
FIG. 19 is an isometric view of still another embodiment of the fixtured, shaped, green ceramic fabric preform segment of this invention.
Figure 20:
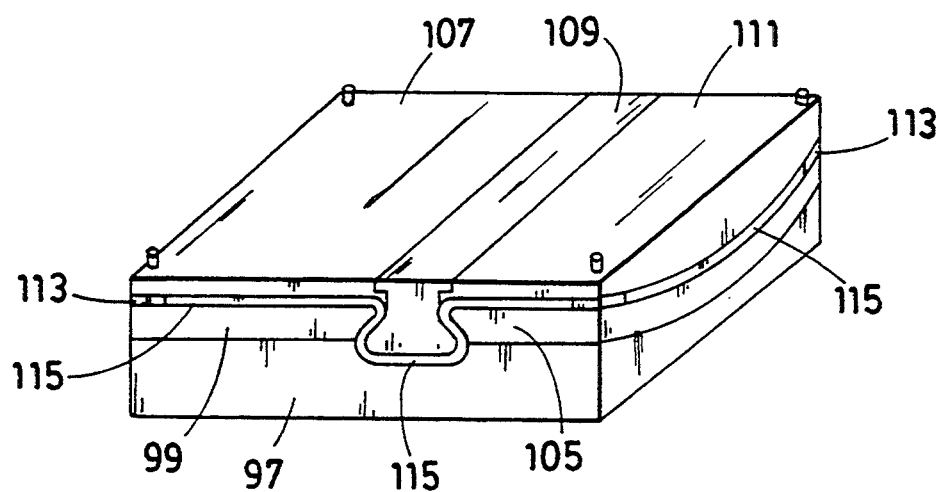
FIG. 20 is an isometric view of yet another embodiment of the fixtured, shaped, green ceramic fabric preform segment of this invention.

In making preform segments for complex composite articles, more than two fixture elements may be employed advantageously in sandwiching the green ceramic fabric. Such instances are illustrated in FIGS. 19 and 20. In FIG. 19, fabric 87 is sandwiched between upper fixture element 89 and lower fixture element 91, two fabric legs being separated by central fixture element 93. The fabric legs can be sewn together at their juncture if desired. Again, spacers 95 ensure that the green fabric is sintered under conditions such that no mechanical strain is introduced into the sintered preform segment resulting therefrom.

FIG. 20 illustrates a more complex set of fixture elements made necessary in order to recover the substantially strain-free, shaped, sintered ceramic fabric preform segment from the fixture. Fixture elements 97, 99, 105, 107, 109, and 111 all come together to sandwich green ceramic fabric 115 between them. Spacers 113 ensure that the green ceramic fabric is sintered under conditions which do not introduce mechanical strain into the fabric.

Figure 21:
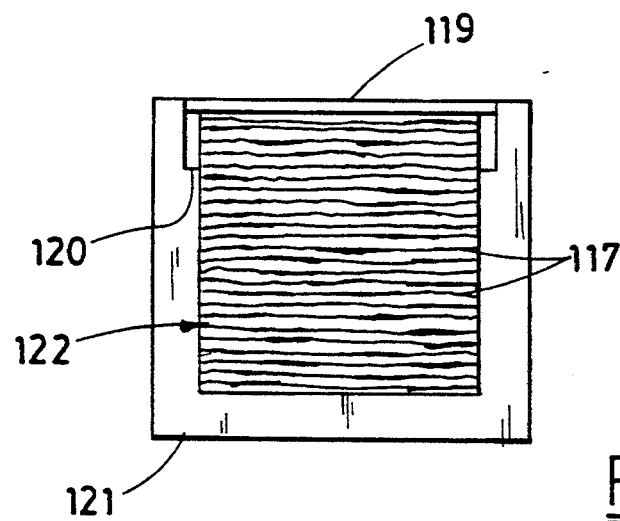
FIG. 21 is an end view of another embodiment of the fixtured, shaped, green ceramic fabric preform segment of this invention.
Figure 22:
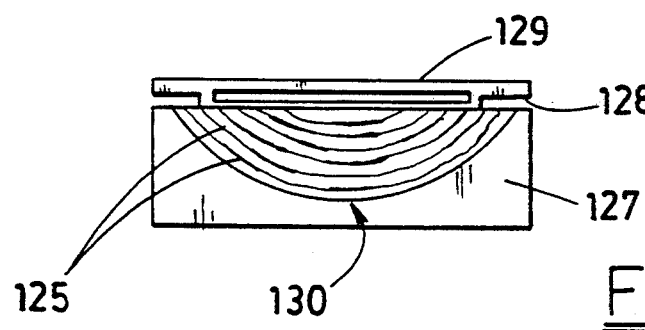
FIG. 22 is an end view of still another embodiment of the fixtured, shaped, green ceramic preform segment of this invention.

FIGS. 21 and 22 illustrate the production of a set of fixtured, shaped, green ceramic fabric preform segments of this invention which can lead to a sintered ceramic fiber-reinforced composite article having prominent 3-dimensional characteristics, i.e., a cylinder. In FIG. 21, rectangular ceramic fabric plies 117 are laid horizontally and stacked vertically in U-shaped open-ended fixture element 121. Top 119 holds fabric array 122 in place. As the fabric sinters and shrinks, top 119 encounters lip 120. Thereafter, fabric array 122 is sintered with no applied pressure. The size of the rectangular pieces of green fabric and the number of plies in the stack are selected so that, upon shrinking during sintering, the final end-on dimensions of the fabric array 122 are just circumscribed by the circumference of the desired cylinder, and the length of the sintered array will equal the desired height of the cylinder. The plies can be sewn or otherwise joined together if desired. Following sintering, the shrunken, sintered fabric array, a substantially strain-free, rectangular parallelepiped-shaped, sintered ceramic fabric preform segment, is readily recovered.

Similarly, as shown in FIG. 22, green fabric plies 125, differing in width, as shown, but being of the same length, are laid horizontally and stacked vertically into the trough-shaped fixture element 127, account being taken of the expected shrinkage during sintering. The plies can be sewn together if desired. Fixture element 129 is then added prior to sintering. As sintering occurs and shrinkage of the fabric array 130 takes place, step 128 encounters fixture element 127, preventing further downward movement of fixture element 129. The result is a substantially strain-free, cylindrical segment-shaped, sintered ceramic fabric preform segment.

Figure 24:
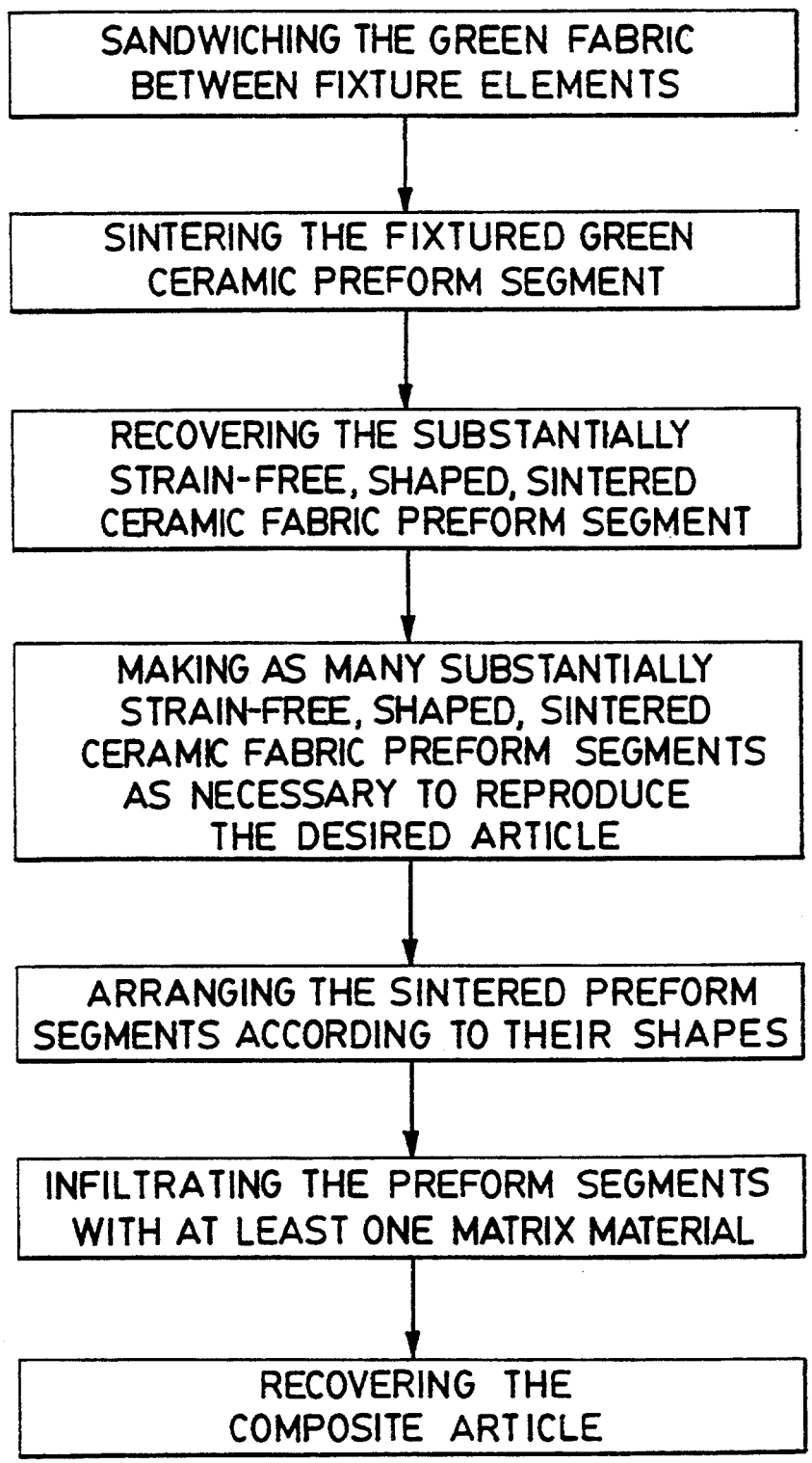
FIG. 24 is a flow diagram illustrating the various process steps involved in making sintered ceramic fiber-reinforced composite articles according to this invention.

Another aspect of the invention is a method for making a substantially strain-free, shaped, sintered ceramic fabric preform segment for a sintered ceramic fiber-reinforced composite article. The steps in this process are shown in FIG. 24. In carrying out this process it is simply necessary to (1) sandwich green ceramic fabric between a plurality of fixture elements shaped to the contour of at least a portion of the desired composite article and nested, but spaced apart by about the thickness of the fabric, yielding a fixtured, green ceramic fabric preform segment shaped to the contour; (2) sinter the fixtured, shaped, green ceramic fabric preform segment; and then (3) recover the substantially strain-free, shaped, sintered ceramic fabric preform segment from the fixture.

Figure 4:
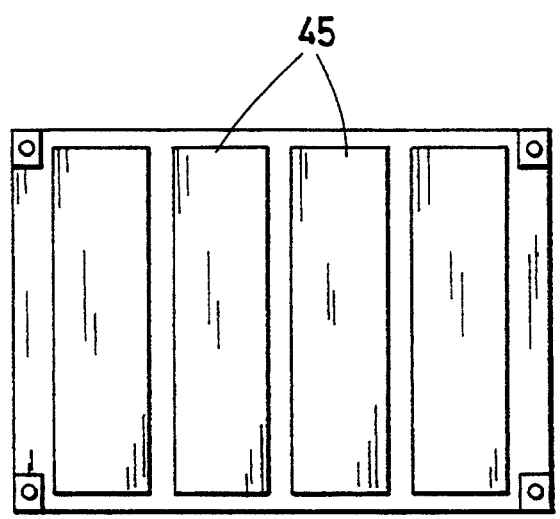
FIG. 4 is a plan view like FIG. 3, but after the fabric has been sintered.

The fixtured green ceramic preform segment is heated to the temperature and for the time necessary to sinter and densify the fabric. If the green ceramic fabric is a non-oxide, sintering typically will be conducted under an inert atmosphere, such as argon. On the other hand, green ceramic fabrics composed of oxide can ordinarily be sintered in air. The times and temperatures required to sinter the various fabrics made of different green ceramic materials are well known to those skilled in the art; for example, see "Engineered Materials Handbook," Vol. 4, "Ceramics and Glasses," ASM International 1991. Upon completion of the sintering operation, the fixture can be disassembled as shown in FIG. 4, exposing the substantially strain-free, shaped, sintered ceramic fabric preform segments 45, which have shrunk in size as a result of the sintering operation.

Figure 5:
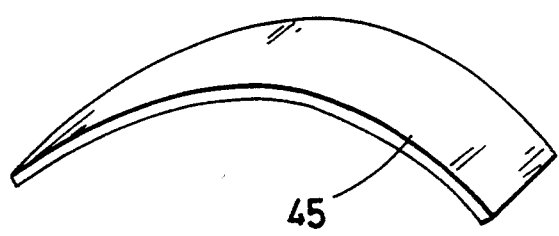
FIG. 5 is an isometric view of one embodiment of the substantially strain-free, shaped, sintered ceramic fabric preform segment of this invention shown in FIG. 4.
Figure 9:
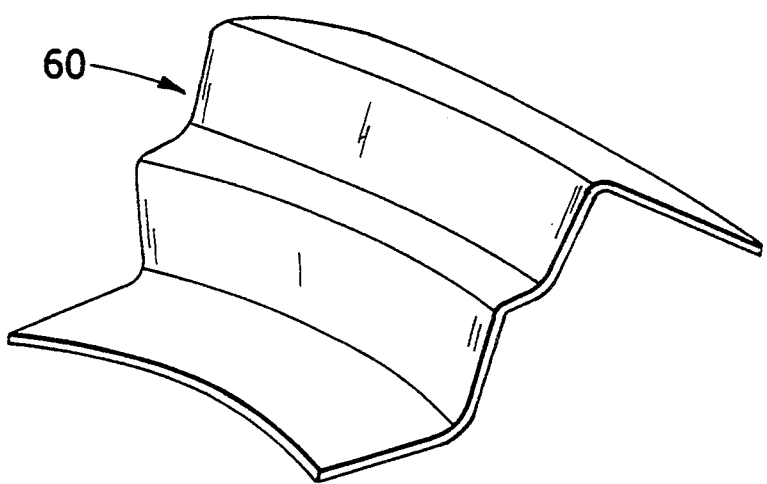
FIG. 9 is an isometric view of another embodiment of the substantially strain-free, shaped, sintered ceramic fabric preform segment of this invention derived from the fixtured, shaped, green ceramic fabric preform segment shown in FIG. 8.

The substantially strain-free, shaped, sintered ceramic fabric preform segments 45 are another aspect of this invention. FIG. 5 shows one of the substantially strain-free, shaped, sintered ceramic fabric preform segments 45 of this invention recovered from the fixture. The sintered preform segment 45 is substantially free of mechanical strain by virtue of the relatively unrestrained environment in which it was sintered. FIG. 9 illustrates a somewhat more complex substantially strain-free, shaped, sintered ceramic fabric preform segment produced from the fixtured, shaped, green ceramic fabric preform segment of FIG. 8.

FIG. 18 shows still another shaped, sintered ceramic fabric preform segment of this invention characterized in that the sintered segment contains complex curvature, requiring that the green fabric be stretched in shaping it. The sintered ceramic fabric preform segment of FIG. 18 is, nevertheless, substantially free of mechanical strain, because even though some force is applied to the green ceramic fabric to shape it as shown in FIG. 17, once the shaped green ceramic fabric is sintered under conditions such that the fabric is free to shrink freely, the sintered fabric remains shaped without internal strain. Any residual strain in the green fabric is relieved during sintering.

The presence of mechanical strain in a ceramic fiber or fabric employed in this invention can be ascertained by means of X-ray or neutron diffraction studies carried out on the sintered fabric, either unused fabric or fabric recovered from a composite article in which the sintered fabric has been employed. See, e.g., P. Klug and L. E. Alexander, "X-ray Diffraction Procedures for Polycrystalline and Amorphous Materials," 2nd Edition, John Wiley & Sons, New York, N.Y., 1974. In addition, identification of the fiber in the fabric, coupled with measurements of the fiber diameter and bending radius can establish whether the sintered fabric was made from green fiber pursuant to this invention, or sintered fiber as described in the prior art.

The ceramic fiber contained in the sintered ceramic fabric preform segments of this invention, as well as in the sintered ceramic fiber-reinforced composite articles of this invention, is generally between about 10 micrometers and about 300 micrometers in diameter and exhibits a flex index of at least about 50. In most cases the substantially strain-free fibers found in the articles of this invention display flex indexes of at least about 200, and in some cases the flex index is greater than about 2000. Consequently, if a sintered ceramic fabric preform, per se or recovered from a composite part, contains sintered fiber woven such that the measured diameter of the fiber, coupled with the measured radius of curvature of fiber in the fabric yields a flex index of at least about 50, the article is within the scope of this invention.

In many cases, a shaped, sintered ceramic fabric preform segment of this invention will be substantially free-standing in the shape conferred on it by the fixture. If not, the preform segment can be stiffened by applying a suitable temporary binder to it, such as a resin which can be removed or carbonized later, e.g., as disclosed in White, U.S. Pat. No. 5,196,120.

It will be evident that numerous identical preform segments can be produced by assembling a fixtured green ceramic preform segment, sintering, disassembling, removing the sintered ceramic preform segment, and repeating the operation. Other sintered ceramic preform segments shaped to the contours of other parts of the desired composite article can be similarly produced using fixtures appropriately shaped to those contours.

The series of sintered ceramic fabric preform segments, shaped to the various contours of the desired composite article, can be assembled and infiltrated directly with a matrix material, e.g., by physical vapor deposition or chemical vapor infiltration (CVI). However, this infiltration technique is limited in application. Of greater general utility is another aspect of this invention. That is, this invention includes a form for a sintered ceramic fiber-reinforced composite article. The form includes a mold and at least one substantially strain-free, shaped, sintered ceramic fabric preform segment of this invention.

In general, when each of the various sintered ceramic fabric preform segments required to reproduce all the contours of the desired composite article has been produced, they can be loaded into the mold. This may be facilitated when the sintered preform segments are substantially free-standing or are made so as described above.

The design considerations that went into determining the lateral extent desired in the sintered preform segments will determine how the preform segments will relate to each other in the mold. In some cases it may be desirable to overlap the edges of some or all of the preform segments. This can be accomplished readily by making the fixtures and the green ceramic fabrics for those segments laterally larger than otherwise called for. On the other hand, it is often more advantageous to design the fixtures laterally so that the various preform segments make butt to butt contact with other preform segments in the mold. Of course, it is possible to design the relationship between the preform segments in the mold so that there will be some overlap contacts and some butt to butt contacts.

It will also be desirable in many instances to use more than one layer of sintered preform segments in providing reinforcement to fill the mold. To the extent that butt to butt contact between the preform segments is planned, it is desirable that one layer of preform segments in the mold be followed by overlaying that underlying layer with one or more additional preform segment layers, the butt to butt contacts between adjacent preform segments being offset in each succeeding layer from the joints in the previous layer, like brickwork. In this way the butt to butt joints are reinforced. This brickwork pattern is illustrated in FIG. 6(a), discussed in greater detail below, in which two fabric layers are utilized.

Figure 6:
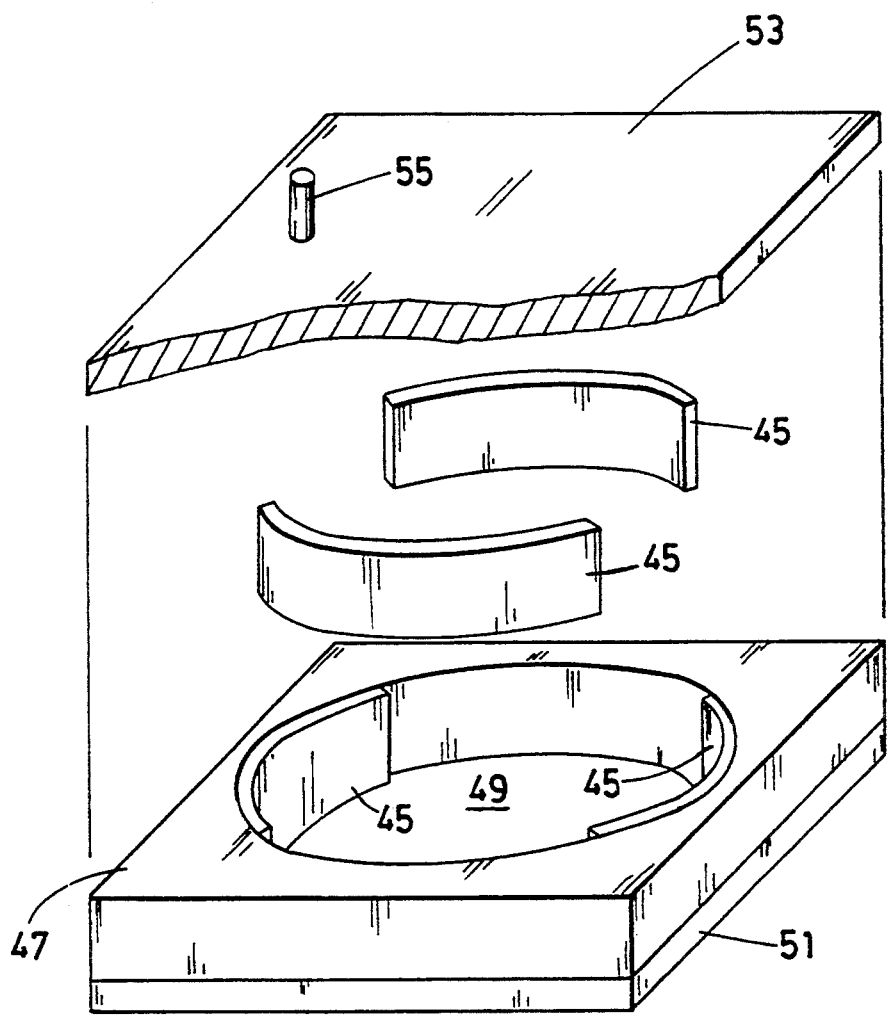
FIG. 6 is an exploded isometric view of one embodiment of the form for a sintered ceramic fiber-reinforced composite article of this invention utilizing the substantially strain-free, shaped, sintered ceramic preform segments shown in FIGS. 4 and 5.

FIG. 6 is the form for a sintered ceramic fiber-reinforced composite article utilizing the substantially strain-free, shaped, sintered ceramic preform segments 45 shown in FIGS. 4 and 5. The form includes a mold enclosing an internal cavity 49 shaped to the contour of the composite article, together with at least one substantially strain-free, shaped, sintered ceramic fabric preform segment 45. The mold of FIG. 6 is porous and includes body 47, bottom 51 and top 53. It is adapted for infiltrating the sintered preform segments with a ceramic matrix slip material. In this case, top 53 carries an optional port 55 for introduction of a ceramic slip infiltrant into the mold cavity 49, and bottom 51 includes an optional drainport (not shown) for spent infiltrant. The slip infiltration technique is well known to those skilled in the ceramics art.

Figure 6A:
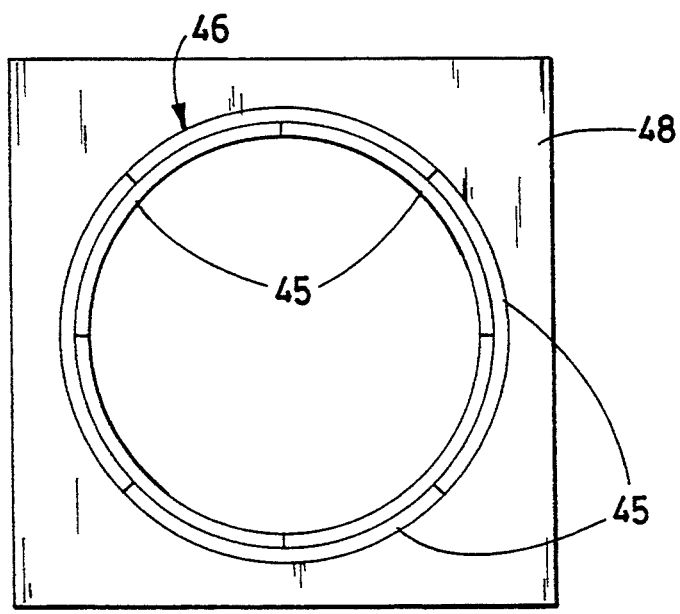
FIG. 6(a) is a top plan view of another embodiment of the form for a sintered ceramic fiber-reinforced composite article of this invention utilizing the substantially strain-free, shaped, sintered ceramic preform segments shown in FIGS. 4 and 5.

It will be evident that if the form of FIG. 6 is not intended to be infiltrated with a ceramic slip, the mold need not be porous, and the volume of the mold could be much less, e.g., as shown in FIG. 6(a), in which two layers of the sintered preform segments 45 are contained in a circular groove 46 in mold body 48. The resultant form of FIG. 6(a) can be infiltrated with molten metal or polymer, or a ceramic matrix by chemical vapor or melt infiltration, for example.

In the embodiments shown in FIGS. 6 and 6(a), a plurality, i.e., four or eight, respectively, substantially strain-free, sintered ceramic fabric preform segments, each shaped to the contour of a part of the composite article, are contained within the mold adjacent those parts. In these embodiments, the sintered preform segments, taken together, are shaped to the contours of all parts of the composite article and are contained in the mold cavity adjacent those parts.

The production of a mold for the desired composite article can be effected by techniques which are well known to those skilled in the art. Under certain circumstances it will be desirable to make the mold of a porous material. For example, in the production of a ceramic matrix composite by slip casting, it may be advantageous to fill the form with an aqueous slurry or slip of the desired ceramic material. Porosity in the mold permits the water to be removed readily. Alternatively, the mold need not be porous if some other technique for adding the ceramic matrix is employed. Generally, a non-porous mold will be employed if a metal or polymer matrix is desired.

Figure 10:
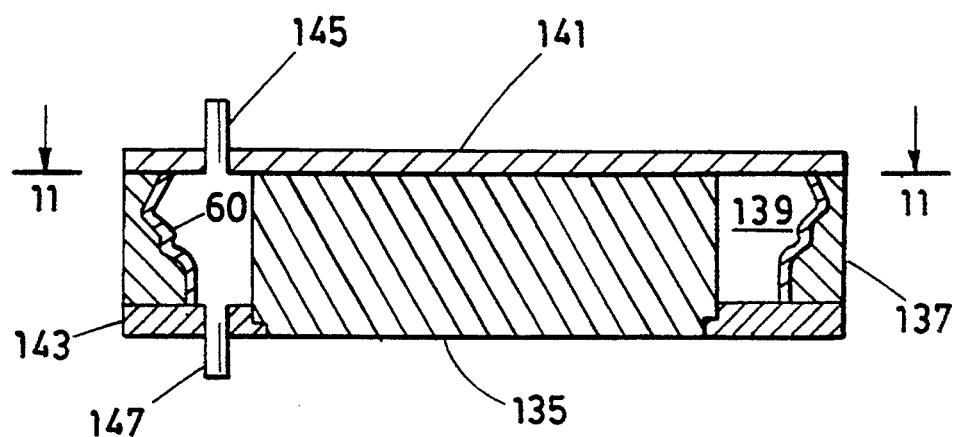
FIG. 10 is a sectional view of another embodiment of the form for a sintered ceramic fiber-reinforced composite article of this invention including the substantially strain-free, shaped, sintered fabric preform segment of FIG. 9.
Figure 11:
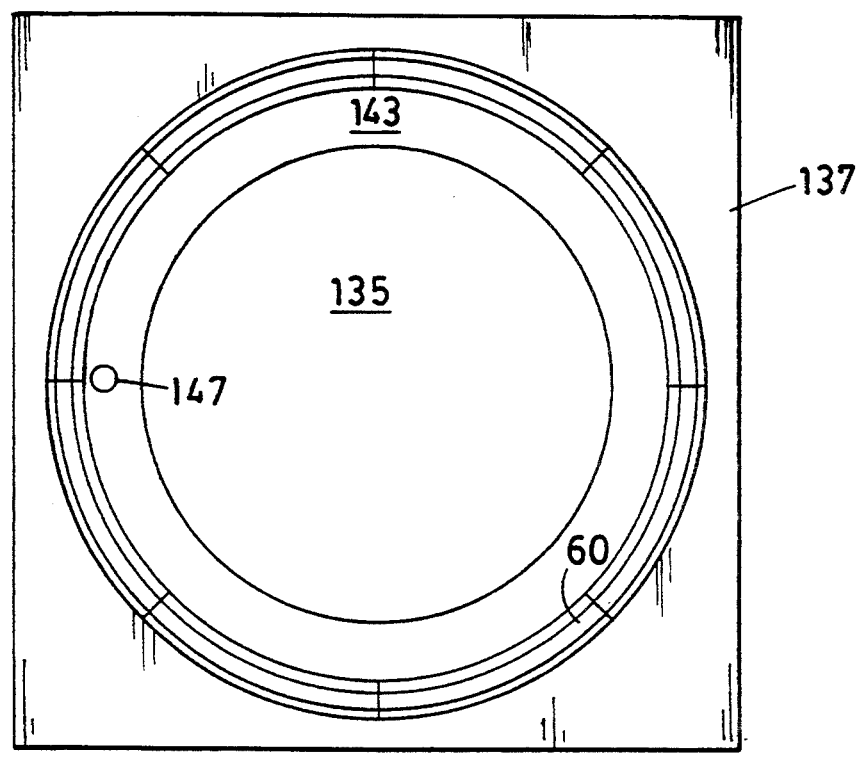
FIG. 11 is a plan view taken along line 11—11 in FIG. 10.

If the desired composite article has an elementary shape, such as a rectangle in two dimensions, for example, or a ring, a single sintered preform segment shape may suffice, e.g., FIGS. 6 and 6(a). The form for a sintered ceramic fiber-reinforced composite article illustrated in FIGS. 10 and 11 is somewhat more complex than that of FIGS. 6 and 6(a) but is still designed to receive a number of identical substantially strain-free, shaped, sintered ceramic preform segments 60 of FIG. 9. In the form of FIGS. 10 and 11, mold cavity 139 is defined by bottom 143, filler 135, body 137, and top 141. A number of identical substantially strain-free, shaped, sintered fabric preform segments 60 are arranged against the contoured face of mold body 137. Since it is intended that the composite article have a ceramic matrix produced by slip casting, mold cavity 139 has an upper port 145 extending through top 141 for introduction of a ceramic slip and a drain 147 for removing spent slip.

In other cases, a plurality of sintered preform segments, each made in a separately designed fixture, may be necessary to reproduce the various contours of the composite article. Then the form for the sintered ceramic fiber-reinforced composite article of this invention will contain substantially strain-free, sintered ceramic fabric preform segments which are not identical, but are of several different shapes, as required by the composite article to be produced. An example of such a form appears in FIG. 23.

Figure 23:
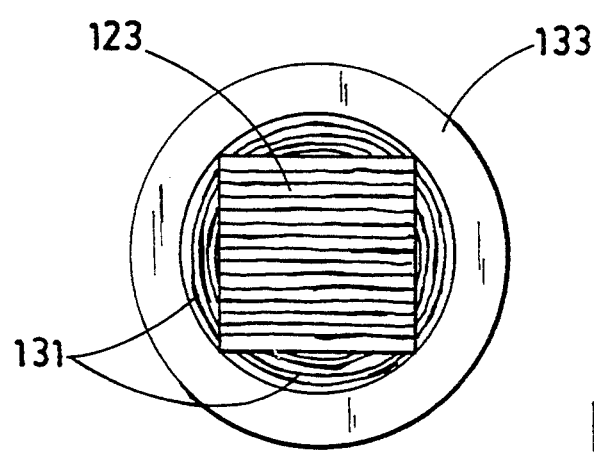
FIG. 23 is top plan view of another form for a sintered ceramic fiber-reinforced composite article of this invention.

In FIG. 23 a substantially strain-free, rectangular parallelepiped-shaped, sintered ceramic fabric preform segment 123, produced from the fabric array 122 of FIG. 21, can be combined in mold 133 with four substantially strain-free, cylindrical segment-shaped, sintered ceramic fabric preform segments 131, produced from four fabric arrays 130 of FIG. 22, to yield the form for a sintered ceramic fiber-reinforced composite article shown in FIG. 23. In this case mold 133 need not be porous if the form is intended to be infiltrated, not with a ceramic slip, but with another matrix material, e.g., a metal or polymer. Alternatively, if mold 133 is porous it can be infiltrated with a ceramic slurry under pressure. It will be evident to those skilled in the art that mold 133 could alternatively contain a single, one piece, 3-dimensionally woven, substantially strain-free, sintered ceramic fabric preform segment, rather than the combination of five sintered preform segments shown in FIG. 23.

Once produced, the form for the desired sintered ceramic fiber-reinforced composite article can be infiltrated with a metal, cermet, intermetallic, polymer, glass-ceramic, or a ceramic material, depending upon the nature of the matrix material desired. If a ceramic fiber-reinforced metal matrix composite is desired, the metal can be infiltrated as a molten liquid, for example, or a metal vapor can be condensed into the form. On the other hand, if a polymer matrix is desired, the polymer can be added in the molten state, or the polymer can be produced in situ from an appropriate combination of reactants, for example. Other infiltration techniques will be evident to those skilled in the art. In this regard, see, e.g., K. K. Chawla, "Ceramic Matrix Composites," Chapman & Hall Inc., New York, N.Y., 1993, pp 135-157.

If it is desired to produce a sintered ceramic fiber-reinforced ceramic matrix composite article, the ceramic material can be infiltrated as solid, liquid or gas into the form very conveniently via several techniques, such as CVI, slip casting, melt infiltration, preceramic polymer precursor infiltration followed by pyrolysis, etc. In the case of slip casting, the ceramic material can be added to the form as a slurry in a liquid, such as water. The mold's porosity allows the liquid to be absorbed. Forms for infiltration by slip casting are illustrated in FIGS. 6, 10 and 11. Forms utilizing non-porous molds and intended for infiltration by materials other than a ceramic slip are shown in FIGS. 6(a) and 23.

In certain instances, infiltration of the form of this invention with the matrix material can leave some residual porosity in the matrix. In those instances it may be desirable to reinfiltrate with additional matrix material(s). In producing a ceramic matrix composite via slip casting, for example, the initial infiltration with the ceramic slurry often yields a composite body with considerable porosity remaining in the matrix. In this case, the porosity can be reduced and substantially eliminated in favorable cases by filling the pores and bonding the ceramic particles together with another matrix material, e.g., a metal. The use of silicon in this capacity is disclosed in, for example, U.S. Pat. Nos. 4,294,788 and 4,944,904, whose contents were summarized above. Infiltration with a second matrix material need not take place in the mold, but it can be done with the semi-finished ceramic matrix composite recovered from the mold and held in appropriate tooling.

The invention also includes the process by which a sintered ceramic fiber-reinforced composite article of this invention is produced. One embodiment of this process is outlined in FIG. 24 and comprises making as many different substantially strain-free, shaped, sintered ceramic fabric preform segments as necessary to reproduce the volume and contour of the desired composite article; arranging the sintered preform segments according to their respective shapes, thereby reproducing the volume and contour of the composite article. The arranged sintered preform segments are then infiltrated with at least one matrix material; and the desired sintered ceramic fiber-reinforced composite article is recovered. In many cases it will prove desirable to provide a mold of the desired composite article in which the sintered preform segments are arranged according to their respective shapes; producing a form for the desired sintered ceramic fiber-reinforced composite article, which can then be infiltrated with the desired matrix material, and the desired composite article can be recovered from the mold.

Figure 7:
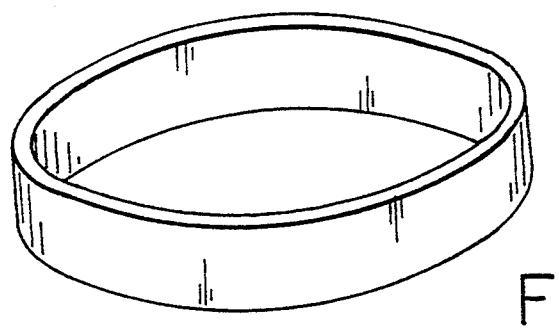
FIG. 7 is an isometric view of one embodiment of the sintered ceramic fiber-reinforced composite article of this invention resulting after infiltration of the form shown in FIG. 6 or 6(a) with a matrix material and recovering the composite article from the form.
Figure 12:
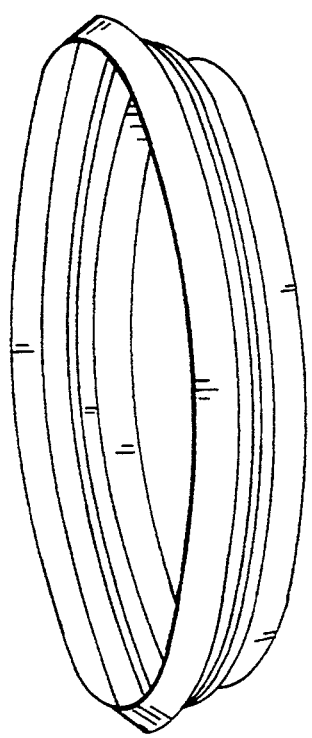
FIG. 12 is an isometric view of another embodiment of the sintered ceramic fiber-reinforced composite article of this invention derived from the form of FIGS. 10 and 11.

Yet another aspect of this invention is the final sintered ceramic fiber-reinforced composite article itself which is recovered after infiltration with at least one matrix material. Embodiments of this aspect of the invention are shown in FIGS. 7 and 12. The sintered ceramic fiber-reinforced composite article of this invention is characterized by the fact that the reinforcement phase is substantially free of mechanical strain. The presence of mechanical strain in the reinforcement phase can be detected as described above by X-ray or neutron diffraction analysis of a sample of the sintered ceramic fiber/fabric reinforcement phase after separating the sample from the matrix phase. Identification of the fiber and measurement of the fiber diameter and the fiber bend diameter in the sintered fabric can also disclose whether the fabric was produced from a green fiber or a sintered fiber.

The manner and means by which the invention can be carried out will be clarified by reference to the following specific Examples:

EXAMPLE 1

Production of a SiC Fiber-Reinforced SiC Matrix Composite Article

Sintered SiC fabric preform segments for a 21 inch diameter circular part of an aircraft engine combustor liner prototype, the segments being 5.0 inches wide, ranging from 0.08 to 0.10 inch thick, with an arc length of 18 inches (approximately 100°), are produced as follows:

With reference now to FIGS. 2-7, two substantially identical graphite fixture elements, large enough to shape and sinter several identical preform segments at once to provide the aforesaid dimensions, and oversize to allow for shrinkage during sintering, etc., are prepared.

Green fabric of 8HS weave is woven from green SiC continuous fiber, prepared according to the method described in Frechette, et al., U.S. Pat. No. 5,354,527, and incorporated herein by reference. Several pieces 35 of the green fabric are laid and sandwiched between seasoned fixture elements 37 and 39, nested, but separated by slightly more than the green fabric thickness, with GRAFOIL spacers 41. The remaining binder is removed and the fixtured green SiC fabric preform segments are sintered by heating the fixtured fabric segments to 2135° C. under an argon atmosphere and holding for 15 min. Several 18 inch long arc-shaped sintered SiC fabric preform segments 45 are made at once in this way. The X-ray diffraction pattern of the sintered fabric indicates the fabric is substantially free of mechanical strain.

The sintered SiC fabric preform segments are then placed in the chamber of a chemical vapor infiltration (CVI) reactor, and a boron nitride interface coating is applied by CVI to the sintered preform segments. The deposition is conducted by first heating the sintered preform segments to about 950° C. under a pressure of about 10 kpa. Gas streams of $BCl_3$, $NH_3$ and $H_2$ are then allowed to flow into the reactor and react to deposit BN. After a hold time of 30 min., a 0.5-1.0 micrometer thick BN coating is deposited on the surfaces of the SiC fibers in the preform segments.

With reference now to FIG. 6, a porous plaster mold of the desired 21 inch diameter circular part defined by elements 47, 51 and 53 is prepared, and one layer of the arc-shaped sintered preform segments, trimmed to size, is laid in the mold butt to butt. A second layer of the sintered preform segments is overlaid on the underlying layer, the end to end joints being offset from the joints in the underlying layer as brickwork, thereby producing a form for the sintered ceramic fiber reinforced composite article.

The form for the composite article is carefully filled with an aqueous infiltration slurry of SiC. The starting slurry contains 49.5 wt % submicron SiC; 26.7 wt % 1000 grit SiC; and 22.8 wt % deionized water; the remainder being made up of minor quantities of dispersant, defoamer, binder, sintering aid and base for pH control. The starting slurry is 76% solids with a pH of 8.5. The infiltration slurry is then produced by adding other components to the starting slurry, such that the composition of the final infiltration slurry is 74.1 wt % starting slurry; 2.3 wt % acrylic emulsion binder; and 22 wt % deionized water; the remainder being made up of minor amounts of surfactant, sodium silicate, and particulate carbon. Ammonium hydroxide is added to bring the pH to 9.5-10. The final slurry contains 56 wt % solids.

The infiltration is allowed to proceed for 2.5 hrs. After the slurry is poured into the mold, the water in the slurry wicks into the porous plaster mold by capillary action, and the particulates in the slurry fill the interfiber voids. The fiber interstices are completely filled with the slurry, and the mold cavity is then drained. The form is dried for 30-45 min. and the mold is disassembled. Excess SiC matrix build-up is trimmed, and the part is air-dried overnight. The part is then carefully removed from the mold surface and trimmed, machined, and sanded, as necessary.

The infiltrated part is next siliconized by heating the part, resting on a graphite cradle, to 1500° C. under vacuum, $2 \times 10^{-4}$ torr, in contact with a cover mix for 30 min. The composition of the cover mix is 94 wt % silicon metal grain, 4 wt % particulate carbon, and 2 wt % phenolic resin. The part in the cradle is then allowed to cool, and the sintered ceramic fiber reinforced composite article is recovered and cleaned. The composite article has a density of 2.83 g/cm$^3$, less than 1 vol % porosity and contains 33 vol % fiber.

EXAMPLE 2

Production of a SiC Fiber-Reinforced $Al_2O_3$ Matrix Composite

A substantially strain-free, shaped, sintered SiC fabric preform segment as shown in FIG. 18, which contains complex curvature, is prepared. The dimensions of the desired sintered ceramic fabric preform segment is 6 inches square, 0.1 inch thick, with a hemispherical dome 1 inch in radius and 1 inch high in the center.

Two graphite fixture elements 79 and 83 as shown in FIG. 17, sized to shape and sinter pieces of the same green SiC fabric utilized in Example 1, but larger than the aforestated dimensions to allow for shrinkage during sintering, are made and mounted on platens 81 and 85 of a press. Fabric 77 is stretched to assume the contour of the fixture elements by bringing the platens together. A set of spacers 78 are used to limit the degree to which the fabric can be squeezed. Once stretched, the platen pressure is removed and the stretched fabric is sintered by heating the fixtured fabric segment to 2135° C. under an argon atmosphere and holding for 15 min. X-ray diffraction analysis of the sintered preform segment indicates that it is substantially free of mechanical strain.

The sintered preform segment is placed in the chamber of a chemical vapor infiltration (CVI) reactor preparatory to the chemical vapor infiltration of a BN interface coating, followed by chemical vapor infiltration (CVI) of the BN-coated, shaped sintered SiC fabric preform segment with an $Al_2O_3$ matrix.

Deposition of the BN interface coating is conducted by first heating the sintered preform segment to a temperature of about 950° C. under a pressure of about 10 kpa. Gas streams of $BCl_3$, $NH_3$ and $H_2$ are then allowed to flow into the reactor and react to deposit BN. After a hold time of 30 min., a 0.5–1.0 micrometer thick BN coating is deposited on the surfaces of the SiC fibers in the preform segment.

Without taking the preform segment out of the CVI chamber, the reactor is re-evacuated and flushed with argon. A mixture of gaseous $Al_2O_3$ precursors $AlCl_3/H_2/CO_2$ is next passed into the reactor at a relatively low pressure of 2–3 kpa at 950° C. to preferentially deposit an alumina matrix in the pores of the sintered SiC preform segment rather than on the exterior surfaces. After an infiltration time of 50 hours, the reactor is allowed to cool, and the sintered SiC fiber-reinforced alumina matrix composite article with complex curvature is retrieved.

EXAMPLE 3

Production of an Alumina Fiber-Reinforced Al Composite Article

Substantially strain-free, shaped, sintered alumina fabric preform segments for producing the cylindrical form shown in FIG. 23, the desired cylinder being 4 inches in diameter and 6 inches in length, are produced. With references now to FIGS. 21 and 22, two sets of alumina fixture elements, one for making the rectangular parallelepiped-shaped preform segment, the other for the cylindrical segment-shaped preform segments, are prepared.

Green fabric of 4HS weave is woven from $Al_2O_3$ continuous fiber, which is prepared according to the method described in Koba, et al., U.S. Pat. No. 4,812,271, incorporated herein by reference, and still contains 40 to 45 wt % of volatile binder components. For making the rectangular parallelepiped-shaped preform segment 123, rectangular pieces of the green fabric are laid horizontally, stacked vertically, and sandwiched between fixture elements 119 and 121 (FIG. 21). A lip 120 limits the degree to which the fabric pieces can be squeezed. The size of the rectangular pieces of green fabric and the number of plies in the stack are selected so that, upon shrinking during sintering, the final dimensions of the rectangular pieces of sintered alumina fabric are 4 inches × 6 inches, and the thickness of the sintered array is equal to 4 inches. The fixtured, shaped green alumina fabric preform segment is then loaded into a furnace. After burning out the remaining binders, the preform is sintered by heating to 1500° C. and holding for 10 minutes.

Similarly, as shown in FIG. 22, green fabric plies, differing in width, as shown, but with the same length, are stacked horizontally into the crescent-shaped fixture element 127, account being taken of the expected shrinkage during sintering. Fixture element 129, heavy enough to maintain the shape of the fabric preform during sintering, but containing step 128 so as not to squeeze the fabric plies during the final stage of sintering, is added prior to sintering. The fixtured, shaped, green alumina fabric preform segment is then sintered in the same way as described earlier for the rectangular parallelepiped-shaped preform segment. The result is a substantially strain-free, cylindrical crescent-shaped, sintered $Al_2O_3$ fabric preform segment. Four of these sintered preform segments are prepared, X-ray diffraction analysis of fibers in the sintered alumina fabric preform segments indicates they are substantially free of mechanical strain.

To prepare a form for a sintered alumina fiber-reinforced aluminum matrix composite cylindrical article, the interior surfaces of mold 133 of FIG. 23 are first sprayed with a thin graphite release coating. The rectangular parallelepiped-shaped, sintered $Al_2O_3$ fabric preform segment 123 is combined in mold 133 with four cylindrical crescent-shaped, sintered $Al_2O_3$ fabric preform segments 131. In the squeeze casting art mold 133, which is not porous, is more commonly known as the "die" and is made of chromium-molybdenum hot-worked steel.

The aluminum infiltrant in then super heated to 150° C. above its melting point, the form of FIG. 23 is heated to 300° C. and a metered volume of molten aluminum is poured into mold 133. The form is then covered, and a pressure of about 100 Mpa is applied until complete solidification of the casting. Finally, the near net-shape sintered alumina fiber-reinforced aluminum matrix composite cylinder is ejected and cleaned.

EXAMPLE 4

Injection Molding of a SiC Fiber Reinforced SiC Composite

A substantially strain-free, dome-shaped, sintered SiC fabric preform segment like that shown in FIG. 18 is prepared as described in Example 2. The sintered preform segment is trimmed to the dimensions desired and is then placed into a female steel mold member matching the contour of the sintered preform segment and consisting of the cavity half of an injection molding machine. The opposing, steel male half of the machine is then closed onto the sintered preform segment in the cavity, completing the mold and the form for a sintered SiC fiber-reinforced composite article shaped like the sintered SiC fabric preform segment. Both halves of the mold are heated to 150° F. using circulating hot water.

A molding compound of the following composition is prepared, pelletized, and loaded into the hopper of the injection molding machine.

| Component | Wt % |
| --- | --- |
| Submicron SiC powder | 58.2 |
| Low Density Polyethylene | 11.0 |
| UHMW Polyethylene | 2.0 |
| Petrolatum | 27.0 |
| Carbon (Raven 1225) | 1.8 |
| | 100.0 |

The injection molding machine is started, and the molding compound is melted and injected into the cavity. After sufficient time to permit the molding compound to solidify, the mold is opened and the sintered SiC fiber-reinforced composite article is ejected and then trimmed.

The dome-shaped composite article is placed on BN-coated graphite tooling in a furnace, and the binder components are baked out of the matrix. The article is next covered with the silicon-containing cover mix of Example 1 and infiltrated with silicon for 30 min. at 1500° C. After cooling and cleaning, the final composite article is recovered.

The invention, described in terms of several representative specific embodiments, is limited only by the scope of the claims.

What is claimed is:

1. A fixtured, shaped, green ceramic fabric preform segment for a sintered ceramic fiber-reinforced composite article comprising in combination
   (a) green ceramic fabric; together with
   (b) a plurality of fixture elements, stable at temperatures exceeding the sintering temperature of the fabric, and capable of being shaped to the contour of at least a portion of the desired composite article, nested but spaced apart to sandwich the green ceramic fabric;
   whereby the shape of the fixture elements is acquired by the green ceramic fabric upon sandwiching the fabric therebetween.

2. The fixtured, green ceramic fabric preform segment of claim 1 wherein said green ceramic fabric comprises green fibers of one or more compositions selected from the group consisting of $Al_2O_3$, $SiO_2$, $ZrO_2$, zircon, mullite, spinel, yttria, $Si_3N_4$, SiC, $B_4C$, BN, $TiB_2$, AlN, and mixtures thereof.

3. The fixtured, green ceramic fabric preform segment of claim 2 wherein said fiber comprises green SiC fiber.

4. The fixtured, green ceramic fabric preform segment of claim 3 wherein said green ceramic fabric is a biaxial woven fabric.

5. The fixtured, green ceramic preform segment of claim 1 wherein the green ceramic fabric comprises multiple plies.

6. The fixtured, green ceramic preform segment of claim 5 wherein the multiple green ceramic fabric plies differ in size.

7. The fixtured, green ceramic preform segment of claim 1 wherein the green ceramic fabric is shaped to a complex curvature.

8. The fixtured, green ceramic preform segment of claim 1 wherein the green ceramic fabric is 3-dimensional.

9. The fixtured, green ceramic preform segment of claim 1 wherein more than two fixture elements are employed.

* * * * *